Aug. 28, 1951 A. J. PETZINGER 2,565,824
POLYPHASE REACTIVE COMPONENT MEASURING DEVICE
Filed Jan. 29, 1948

WITNESSES:

INVENTOR
Ambrose J. Petzinger.
BY
ATTORNEY

Patented Aug. 28, 1951

2,565,824

UNITED STATES PATENT OFFICE 2,565,824

POLYPHASE REACTIVE COMPONENT MEASURING DEVICE

Ambrose J. Petzinger, Fair Lawn, N. J., assignor to Westinghouse Electric Corporation, East Pittsburgh, Pa., a corporation of Pennsylvania Application January 29, 1948, Serial No. 5,117

9 Claims. (Cl. 171—34)

This invention relates to electrical measuring devices and it has particular relation to devices for measuring a reactive component of the power in a three-phase alternating-current system.

For measuring a reactive component of power in an alternating-current system, it has been the general practice to employ phase shifters which in some cases are known as "phase transformers" or "reactive component compensators." The prior art practice is set forth in the Electrical Metermen's Handbook, published in 1940 by the Edison Electric Institute of New York City, 5th edition. The reactive component desired may be instantaneous reactive power, reactive power demand or integrated reactive power. Another form of reactive power meter is disclosed in the Lenehan Patent 1,732,687.

In accordance with the invention, devices for measuring a reactive component of a three-phase system are energized directly from the associated three-phase system. By a novel selection of voltages and currents supplied to a suitable measuring device, the invention eliminates the phase shifters formerly employed for such measurements.

It is, therefore, an object of the invention to provide an improved device for measuring a reactive component of a three-phase alternating-current electrical system.

It is a further object of the invention to provide a measuring device for measuring a reactive component of a three-phase alternating-current electrical system wherein the measuring device is energized directly from the associated system without necessitating the utilization of phase shifters.

Other objects of the invention will be apparent from the following description taken in conjunction with the accompanying drawing, in which.

The invention is applicable to various polyphase alternating-current electrical systems operating at any desired frequency. For the purpose of illustration, the invention will be discussed with reference to three of the systems commonly encountered in the art, namely (1) the three-wire three-phase alternating-current system, (2) the four-wire star-connected three-phase alternating-current system, and (3) the four-wire delta-connected alternating-current system. It will be assumed for the purpose of discussion that the systems operate at a frequency of 60 cycles per second.

Figure 1:
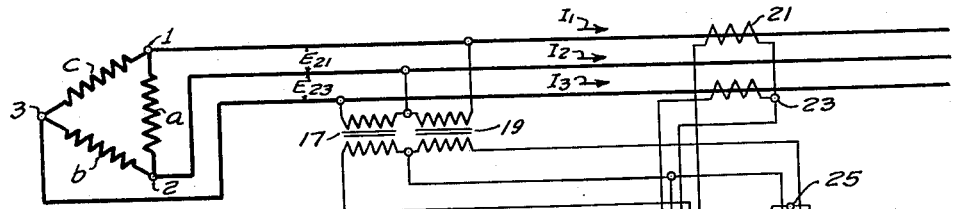
Figure 1 is a schematic view of an alternating-current system embodying the invention.

Referring to the drawing, Fig. 1 shows a three-wire three-phase alternating-current electrical system employing phase-conductors 1, 2 and 3. Although, as well understood in the art, the system may be energized from either delta- or star-connected windings, it will be assumed that the system is energized from three delta-connected windings $a$, $b$ and $c$ which constitute the secondary windings of a conventional polyphase power transformer.

Figure 1A:
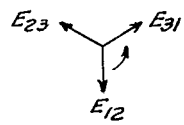
Figure 1A is a vector diagram showing voltage relationships for the system of Fig. 1.

For the purpose of discussing the invention, a conventional system of notation will be employed. The phase-conductors 1, 2 and 3 carry respectively currents $I_1$, $I_2$ and $I_3$. The voltages between the phase conductors are represented by the symbol E accompanied by a subscript formed by the numerals of the phase conductors between which the voltage is taken. For example, the voltage $E_{21}$ represents the voltage between the phase conductors 2 and 1. A reversal of the numerals in the subscript indicates a reversal in phase of the voltage represented thereby. As shown in Fig. 1A, a conventional counter-clockwise rotation of the vectors representing the three phase voltages is assumed and the phase conductors have been numbered in accordance with such phase rotation.

In order to measure a reactive component of the system shown in Fig. 1, a two and one-half element meter (also known as a two-element split-coil meter) 11 is employed. Such a meter is well known in the art and includes two elements 13 and 15. The upper element 13 has a voltage winding 13a and two current windings 13b and 13c. The lower element 15 has a voltage winding 15a and two current windings 15b and 15c. The voltage winding 15a and its associated current windings 15b and 15c operate when energized to establish a shifting magnetic field. Similarly, the voltage winding 13a and associated current windings 13b and 13c cooperate when energized to establish a second shifting magnetic field. As well understood in the art, a common electroconductive armature or two mechanically connected armatures may have portions disposed in the two shifting magnetic fields for rotation in response to torques developed by the fields acting on the armatures.

For energizing the meter 15, a voltage transformer 17 has its primary connected for energization by the voltage $E_{23}$. A voltage transformer 19 has its primary winding connected for energization in accordance with the voltage $E_{21}$. The secondary windings of the transformers 17 and 19 are connected respectively to the voltage windings 15a and 13a. If the system voltages are of proper magnitude, it may be unnecessary to employ the voltage transformers. In such a case, the voltage windings 13a and 15a would be connected directly across the appropriate phase conductors. Current transformers 21 and 23 have their primary windings respectively in the phase conductors 1 and 3 for supplying energy to the current windings of the meter 15.

The operation of the system illustrated in Fig. 1 may be understood more clearly from a brief consideration of the underlying theory. From Blondel's theorem, the real power $P$ flowing in the phase conductors 1, 2 and 3 is represented by the following expression:

$$P = I_2 E_{23} + I_1 E_{13} \qquad (1)$$

Inasmuch as the reactive power $Q$ is in quadrature with the real power $P$, the reactive power may be obtained by rotating the voltages of Equation 1 by 90°. For measuring leading reactive power, the voltages should be rotated counterclockwise 90° as represented by the vector operator $j$. (It will be understood that the voltages and currents herein discussed are vector quantities.) For measuring lagging reactive power, the voltages should be rotated 90° in the opposite direction as indicated by the operator $(-j)$. Since in most cases it is desired to measure lagging power, the reactive power $Q$ may be represented by the following expression:

$$Q = I_2(-jE_{23}) + I_1(-jE_{13}) \qquad (2)$$

The invention assumes that the phase or line voltages always remain balanced. In modern distribution systems, the unbalance of the voltages generally is so small that the error resulting from the assumption is within acceptable limits. It should be pointed out, however, that the accuracies of conventional devices for measuring polyphase reactive power disclosed in the aforesaid Metermen's Handbook (see page 20) are all dependent on the voltage balance of the associated polyphase system.

In conventional systems for measuring reactive power, Equation 2 has been followed and the desired rotation of voltages has been obtained by means of phase shifters or reactive component compensators. In accordance with the invention, the vector operator is eliminated by making suitable substitutions in Equation 2. Recalling that for balanced voltages $$-jE_{23} = \frac{E_{21} + E_{31}}{\sqrt{3}}$$

$$-jE_{13} = \frac{E_{23} + E_{21}}{\sqrt{3}}$$

and making the indicated substitutions, Equation 2 may be rewritten as follows:

$$Q = \frac{1}{\sqrt{3}}[E_{21}(I_2 + I_1) + E_{31}I_2 + E_{23}I_1] \qquad (3)$$

Equation 3 may be simplified by making the substitution $$E_{31} = E_{32} + E_{21}$$

This substitution results in the following expression:

$$Q = \frac{1}{\sqrt{3}}[E_{21}(2I_2 + I_1) + E_{23}(I_1 - I_2)] \qquad (4)$$

A study of Equation 4 indicates that this equation may be employed as a basis for measuring reactive power without employing phase shifters. For example, if the voltage winding 13a of the meter is energized in accordance with the voltage $E_{21}$, voltage winding 15a is energized in accordance with the voltage $E_{23}$, the current winding 13c is energized in accordance with $2I_2$, the current windings 13b and 15c are energized in accordance with the current $I_1$ and the current winding 15b is energized in accordance with the current $I_2$, the meter 15 has an output dependent on reactive power. It will be understood that the polarities of the connections are selected to satisfy Equation 4.

Some simplification of Equation 4 may be obtained by making the substitution:

$$I_1 = -I_2 - I_3$$

to produce the following equation:

$$Q = \frac{1}{\sqrt{3}}[E_{12}(I_3 - I_2) + E_{23}(I_1 - I_2)] \qquad (5)$$

The expressions $$E_{21}(2I_2 + I_1)$$

and $$E_{12}(I_3 - I_2)$$

are full equivalents. However, the latter facilitates the utilization of similar equipment throughout for the reason that it eliminates the multiplying factor for the current $I_2$.

The meter 11 of Fig. 1 is illustrated as connected in accordance with the requirements of Equation 5. It will be noted that the current winding 13b is connected in series with the secondary winding of the current transformer 23 for energization in accordance with the current $I_3$. The current winding 15b of the meter is connected in series with the secondary winding of the transformer 21 for energization in accordance with the current $I_1$. Inasmuch as the current $I_2$ is equal to $-(I_1 + I_3)$, the currents from the windings 13b and 15b are conducted to a common terminal 25 from which a current equal in value to $I_2$ flows through the windings 13c and 15c in series to the right-hand terminals of the current transformer secondary windings.

From the foregoing discussion, it will be apparent that when the meter 11 is connected as illustrated in Fig. 1, the meter armature will be actuated in accordance with the reactive power of the three-phase three-wire electrical system. The meter may include conventional integrating registers, demand indicators, and recording mechanism, as desired.

The factor $$\frac{1}{\sqrt{3}}$$

which appears in Equation 5 is a constant which can be incorporated in the meter in various ways. For example, a register ratio may be selected to provide directly the desired reading, or a demand scale may be calibrated for direct reading. As a further alternative, the meter speed may be adjusted in accordance with the factor as by proper selection of transformer ratios or by proper selection of the number of turns on the meter windings, or by proper adjustment of the damping magnet employed on an integrating reactive power meter. For the three-phase four-wire alternating-current system of Fig. 2, the three conductors 1, 2 and 3 are connected to the terminals of three star-connected windings $a'$, $b'$ and $c'$. These windings represent the star-connected secondary windings of a conventional three-phase power transformer. The neutral point of the star-connected windings is connected to a neutral conductor $0$ to direct a current $I_0$ through the neutral conductor. A two-element meter 27 is employed which includes elements 29 and 31. The element 29 has a voltage winding $29a$ and two current windings $29b$ and $29c$. The element 31 has a voltage winding $31a$ and two current windings $31b$ and $31c$. The voltage windings $29a$ and $31a$ are connected through voltage transformers 33 and 35 respectively for energization in accordance with the voltages $E_{30}$ and $E_{10}$. If the meter voltage windings can be designed conveniently for line voltages, the voltage transformers need not be employed. The current transformers 21 and 23 are again employed but an additional transformer 22 has its primary winding included in the conductor 2.

Figure 2:
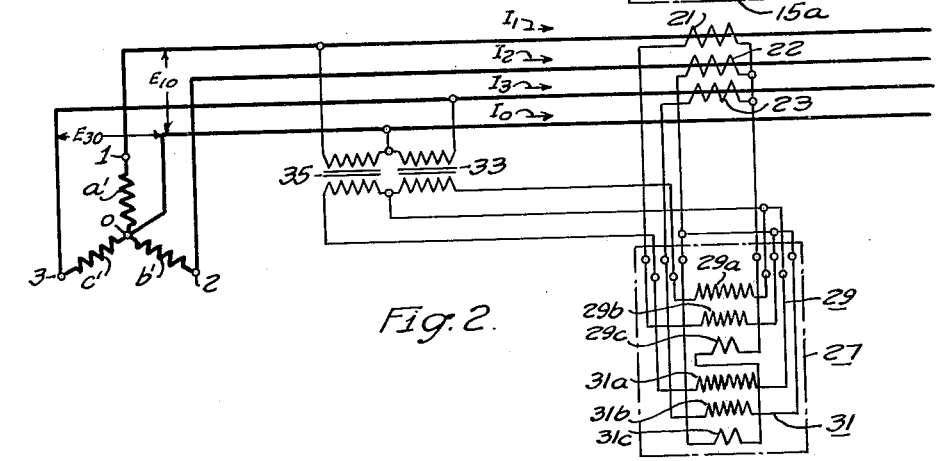
Figs. 2 and 3 are schematic views showing alternating-current systems embodying modified forms of the invention.

The connections of the meter 27 in Fig. 2 may be understood from the following discussion. By inspection of Fig. 2, it will be observed that reactive power Q of the system may be represented by the following expressions:

$$Q = \frac{1}{\sqrt{3}}(E_{32}I_1 + E_{13}I_2 + E_{21}I_3) \quad (6)$$

$$= \frac{1}{\sqrt{3}}[(E_{30}+E_{02})I_1 + (E_{10}+E_{03})I_2 + (E_{20}+E_{01})I_3] \quad (7)$$

By substituting $$E_{02} = -(E_{01}+E_{03})$$

Equation 7 becomes $$Q = \frac{1}{\sqrt{3}}[E_{01}(2I_3 - I_1 - I_2) + E_{03}(I_2 + I_3 - 2I_1)] \quad (8)$$

Equation 8 may be simplified by substituting $$I_1 + I_2 + I_3 = -I_0$$

to produce the following expression $$Q = \frac{1}{\sqrt{3}}[E_{01}(3I_3 + I_0) - E_{03}(3I_1 + I_0)] \quad (9)$$

In order to measure reactive power in accordance with Equation 9, the meter 27 must properly weight the currents. The secondary windings of the current transformers are connected in star and the neutral connection of the windings is connected to the windings $29c$ and $31c$ to energize these windings in accordance with the current $I_0$. The current winding $29b$ is connected to the secondary winding of the current transformer 21 for energization in accordance with the current $I_1$. A current winding $31b$ is connected to the secondary winding of the current transformer 23 for energization in accordance with the current $I_3$. The output of the current transformer 22 is combined with the currents passing through the windings $29b$ and $31b$ to produce a current proportional to the neutral current $I_0$ for energizing the windings $31c$ and $29c$.

The desired weighting of the currents could be obtained by providing separate transformers for the currents $I_3$, $I_0$ and $I_1$ and then adjusting the turn ratios of the transformers to provide the desired weighting. To permit the utilization of similar current transformers, the desired weighting is obtained in Fig. 2 by providing the current windings $29b$ and $31b$ with three times the number of turns employed for the windings $29c$ and $31c$. When the meter 27 of Fig. 2 is connected as illustrated, it may be calibrated to read directly the reactive power of the associated electrical system. The factor $$\frac{1}{\sqrt{3}}$$

is incorporated in the manner discussed with reference to Fig. 1.

Figure 3:
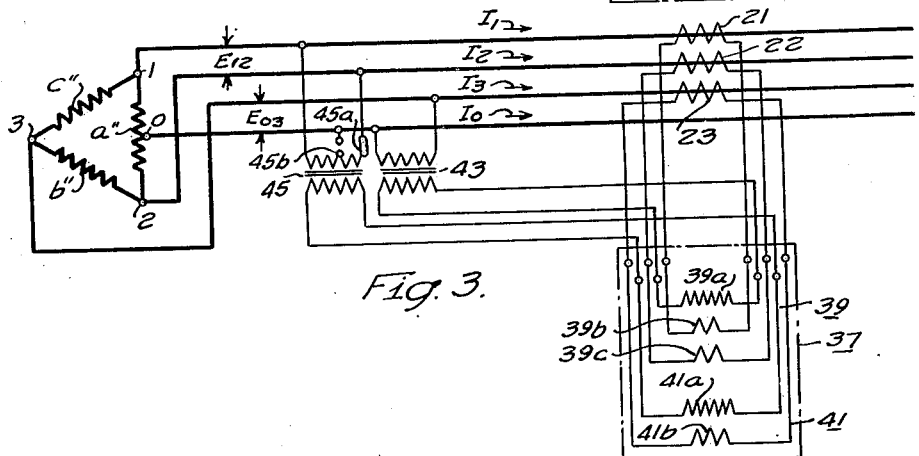

In Fig. 3, the conductors 1, 2, 3 and 0 again are employed for providing a three-phase four-wire service. These conductors are connected to delta-connected secondary windings $a''$, $b''$ and $c''$ of a power transformer. It will be noted that the winding $a''$ has a center tap to which the neutral conductor 0 is connected.

For measuring a reactive component of the alternating current circuit, a two-element meter 37 is provided which includes an upper element 39 and a lower element 41. The upper element of the meter comprises a voltage winding $39a$ and two current windings $39b$ and $39c$. The lower element 41 includes a voltage winding $41a$ and one current winding $41b$. The voltage windings $39a$ and $41a$ are connected respectively through voltage transformers 43 and 45 for energization in accordance with voltages $E_{03}$ and $E_{12}$. Since the voltages $E_{10}$ and $E_{02}$ are each equal to one-half the voltage $E_{12}$, either of the voltages $E_{10}$ and $E_{02}$ may be employed for energizing the transformer 45 if the transformation ratio of the transformer is selected to provide the desired output voltage. This is indicated in Fig. 3 by a removable link $45a$ which is employed to connect one terminal of the primary winding to the conductor 2. If desired, this link may be transferred to an intermediate tap $45b$ on the primary winding to connect the intermediate tap to the conductor 0. If the meter voltage windings can be designed conveniently for energization directly by the desired line voltages, the voltage transformers need not be employed. The current transformers 21, 22 and 23 again are employed with the conductors 1, 2 and 3, respectively.

The desired connections of the meter 27 may be understood from a development of an expression for reactive power. In accordance with Blondel's theorem, the real power P for the circuit shown in Fig. 3 may be expressed as follows:

$$P = E_{12}\frac{(I_1 - I_2)}{2} + E_{30}I_3 \quad (10)$$

In order to obtain the reactive power, the voltages, Equation 10, may be replaced by corresponding quadrature voltages as follows:

$$Q = \frac{1}{\sqrt{3}}\left[E_{03}(I_1 - I_2) + \frac{3}{2}E_{12}I_3\right] \quad (11)$$

To satisfy this equation, the current windings $39b$, $39c$ and $41b$ are connected for energization respectively across the secondary windings of the current transformers 21, 22 and 23. The desired weighting represented by the factor $$\frac{3}{2}$$

in Equation 11 may be obtained by proper selection of the ratios of the voltage transformers 43 and 45, by proper selection of the ratios of the current transformers 21, 22 and 23 or by proper selection of the number of turns in the current windings $39b$, $39c$ and $41b$. For example, in Fig. 3, it may be assumed that the transformers 43 and 45 as connected have equal transformation ratios and that the current transformation 21, 22 and 23 have equal transformation ratios. The desired weighting is obtained by providing the current winding $41b$ with $$\frac{3}{2}$$

of the number of turns employed for the current windings $39b$ and $39c$. The meter 37 when connected as illustrated with proper polarities as indicated by the Equation 11 may be calibrated to read directly the reactive power of the associate alternating-current circuit. The factor $$\frac{1}{\sqrt{3}}$$

may be incorporated in the manner discussed previously for the corresponding factor of Fig. 1.

Although the invention has been described with reference to certain specific embodiments thereof, numerous modifications falling within the spirit and scope of the invention are possible.

I claim as my invention:

1. In a device for measuring a reactive component of a three-phase alternating-current system having three phase-conductors numbered in the order of conventional phase rotation 1, 2, 3 carrying currents $I_1$, $I_2$ and $I_3$ respectively, said system having a voltage $E_{12}$ between the conductors 1 and 2 and having a voltage $E_{23}$ between the conductors 2 and 3, a multi-element meter having watt-responsive elements, and means connecting the elements to the system for energization respectively in accordance with the expressions $E_{12}(I_3-I_2)$ and $E_{23}(I_1-I_2)$ to provide a meter response proportional to the expression $$E_{12}(I_3-I_2)+E_{23}(I_1-I_2)$$

said means comprising a pair of current transformers, connections for energizing the elements from said current transformers in accordance with the respective currents supplied to the current transformers, and connections for energizing said elements from said current transformers in accordance with the vector resultant of the respective currents supplied to the current transformers.

2. A device as claimed in claim 1, wherein a first one of said watt-responsive elements has a voltage winding connected for energization in accordance with the voltage between the conductors 1 and 2, and a pair of current windings connected for energization respectively in accordance with the currents in the conductors 2 and 3, and wherein a second one of the watt-responsive elements has a voltage winding connected for energization in accordance with the voltages between the conductors 2 and 3, and a pair of current windings connected for energization respectively in accordance with the currents in the conductors 1 and 2.

3. In combination with a three-phase, four-wire, star-connected alternating-current system having three phase-conductors numbered in the order of conventional phase rotation 1, 2, 3 carrying currents $I_1$, $I_2$ and $I_3$ and a neutral conductor carrying a current $I_0$, said system having voltages $E_{10}$ and $E_{30}$ between the phase-conductors 1 and 3 respectively and the neutral conductor, a device for measuring a reactive component of the system comprising a multi-element meter having watt-responsive elements, each of said elements including voltage and current windings and means connecting the elements to the system for energization respectively in accordance with the expression $E_{01}(3I_3+I_0)$ and $E_{03}(3I_1+I_0)$ to provide a meter response proportional to the expression $E_{01}(3I_3+I_0)-E_{03}(3I_1+I_0)$.

4. A device as claimed in claim 3, wherein a first one of said elements has a voltage winding connected for energization in accordance with the voltage between the conductor 1 and the neutral conductor, and a pair of current windings connected for energization respectively in accordance with the currents in the conductor 3 and in the neutral conductor weighted in accordance with the expression $(3I_3+I_0)$, and wherein a second one of the elements has a voltage winding connected for energization in accordance with the voltage between the conductor 3 and the neutral conductor, and a pair of current windings connected for energization respectively in accordance with the currents in the conductor 1 and the neutral conductor weighted in accordance with the expression $(3I_1+I_0)$.

5. In a device for measuring a reactive component of a three-phase, four-wire, delta-connected alternating-current system having three phase-conductors numbered in the order of conventional phase rotation 1, 2, 3 carrying currents $I_1$, $I_2$ and $I_3$ respectively and having a neutral conductor providing with the conductors 1, 2 a three-wire single-phase service, said system having a voltage $E_{03}$ between the neutral conductor and the phase conductor 3, and said system having a voltage $E_{12}$ between the phase conductors 1 and 2, a multi-element meter having watt-responsive elements, and means connecting the elements to the system for energization respectively in accordance with the expressions $E_{03}(I_1-I_2)$ and $$\frac{3}{2}E_{12}I_3$$

to provide a meter response proportional to the expression $$E_{03}(I_1-I_2)+\frac{3}{2}E_{12}I_3$$

6. A device as claimed in claim 5 wherein a first one of said elements has a voltage winding connected for energization in accordance with said voltage $E_{03}$, and a pair of current windings connected for energization respectively in accordance with currents in the conductors 1 and 2, and wherein a second one of the elements has a voltage winding connected for energization in accordance with the voltage $E_{12}$, and a current winding connected for energization in accordance with the current $I_3$.

7. In a device for measuring a reactive component of a three-phase, four-wire system, a two-element, watt-responsive meter comprising a first element having a voltage winding and first and second current windings cooperating with the voltage winding, and a second element having a voltage winding and first and second current windings cooperating with the last-mentioned voltage winding, means connecting the first current windings of the elements for energization from a source of energy, separate connection means for connecting each of the second current windings, to a separate source of energy, said current windings and connection means being weighted to provide for the second current windings three times the ampere turns of the first current windings when said sources are equal to each other in magnitude.

8. In a device for measuring a reactive component of a three-phase, four-wire system, a two-element, watt-responsive meter comprising a first element having a voltage winding and first and second current windings cooperating with the voltage winding, and a second element having a voltage winding and a current winding cooperating with the last-named voltage winding, means connecting the windings for energization from sources of voltages and current, said windings and connecting means being weighted to provide ratios of input to the connecting means to output from the elements which bear the relationship of 2 to 3 for the first element and associated connecting means relative to the second element and associated connecting means.

9. In a device for measuring a reactive component of a three-phase, four wire, alternating-current system having three phase conductors numbered in the order of conventional phase rotation 1, 2, 3 carrying currents $I_1$, $I_2$, $I_3$ and a neutral conductor carrying a current $I_0$, a multi-element meter having two watt-responsive elements each including voltage and current windings, and translating means responsive to a function of the voltage and current applied to the windings of each of the elements, connections for energizing a voltage winding of a first one of said elements in accordance with the phase and magnitude of the voltage between the neutral conductor and a first one of said phase conductors, connections for energizing a voltage winding of a second one of said elements in accordance with the phase and magnitude of the voltage between the neutral conductor and a second one of the phase conductors, and connections for energizing the current windings from said phase conductors to provide a response by the translating means which is dependent on the reactive power of the system.

AMBROSE J. PETZINGER.

REFERENCES CITED

The following references are of record in the file of this patent:

UNITED STATES PATENTS

| Number | Name | Date |
| --- | --- | --- |
| 1,281,399 | Landis | Oct. 15, 1918 |
| 1,580,408 | Cheetham | Apr. 13, 1926 |